US012698356B2

(12) United States Patent
Song et al.

(10) Patent No.: US 12,698,356 B2
(45) Date of Patent: Aug. 4, 2026

(54) SUPERABSORBENT POLYMERS BASED ON COPOLYMERS OF CHARGED MONOMERS AND NEUTRAL MONOMERS

(71) Applicants: Kimberly-Clark Worldwide, Inc., Neenah, WI (US); MCMASTER UNIVERSITY, Hamilton (CA)

(72) Inventors: Xuedong Song, Alpharetta, GA (US); Kaiyuan Yang, Cumming, GA (US); Todd Ryan Hoare, Ancaster (CA); Zohreh Jomeh Farsangi, Hamilton (CA)

(73) Assignees: Kimberly-Clark Worldwide, Inc., Neenah, WI (US); MCMASTER UNIVERSITY, Hamilton (CA)

( * ) Notice: Subject to any disclaimer, the term of this patent is extended or adjusted under 35 U.S.C. 154(b) by 770 days.

(21) Appl. No.: 17/914,628

(22) PCT Filed: Apr. 30, 2020

(86) PCT No.: PCT/US2020/030618

§ 371 (c)(1),
(2) Date: Sep. 26, 2022

(87) PCT Pub. No.: WO2021/221642

PCT Pub. Date: Nov. 4, 2021

(65) Prior Publication Data

US 2023/0118553 A1 Apr. 20, 2023

(51) Int. Cl.

| | |
|---|---|
| ***C08F 220/28*** | (2006.01) |
| ***A61L 15/60*** | (2006.01) |
| ***B01J 20/26*** | (2006.01) |
| ***B01J 20/30*** | (2006.01) |
| ***B01J 20/32*** | (2006.01) |
| ***C08F 220/06*** | (2006.01) |
| ***C08F 220/20*** | (2006.01) |
| ***C08F 220/58*** | (2006.01) |
| ***C08J 3/24*** | (2006.01) |
| ***C08L 33/08*** | (2006.01) |
| ***C08L 33/10*** | (2006.01) |

(52) U.S. Cl.

CPC ......... *C08F 220/286* (2020.02); *B01J 20/267* (2013.01); *B01J 20/3021* (2013.01); *B01J 20/3078* (2013.01); *B01J 20/3282* (2013.01); *B01J 2220/68* (2013.01)

(58) Field of Classification Search

CPC .......................... C08F 220/286; C08F 220/06; C08F 220/585; C08F 220/20; B01J 20/267; B01J 20/3021; B01J 20/3078; B01J 20/3282; B01J 2220/68; A61L 15/60; C08J 3/245; C08L 33/08; C08L 33/10

See application file for complete search history.

(56) References Cited

U.S. PATENT DOCUMENTS

| | | | |
|---|---|---|---|
| 4,914,170 A | 4/1990 | Chang et al. | |
| 5,739,210 A | 4/1998 | Scranton et al. | |
| 6,689,934 B2 | 2/2004 | Dodge, II et al. | |
| 7,179,851 B2 | 2/2007 | Qin et al. | |
| 7,321,007 B2 | 1/2008 | Gagliardi et al. | |
| 7,381,768 B2 | 6/2008 | Wiercinski et al. | |
| 7,494,944 B2 | 2/2009 | Talingting-Pabalan et al. | |
| 9,162,007 B2 | 10/2015 | Bitis et al. | |
| 2007/0207309 A1 | 9/2007 | Gonzales et al. | |
| 2016/0074832 A1* | 3/2016 | Loick ........................ | C08F 2/44 562/571 |

FOREIGN PATENT DOCUMENTS

| | | |
|---|---|---|
| CN | 104024291 A | 9/2014 |
| CN | 104974312 A | 10/2015 |
| CN | 105392805 A | 3/2016 |
| KR | 20160031983 A | 3/2016 |
| WO | 2007070776 A2 | 6/2007 |
| WO | 2016085123 A1 | 6/2016 |

OTHER PUBLICATIONS

Ethylene glycol methyl ether methacrylate, water solubility 31mg/mL_ChemBank (downloaded 2025).*

Lee et al., Journal of Applied Polymer Science, (2006), v. 102, p. 927-934. (Disclosed in IDS and provided by Applicant).*

Google AI search—Does water solubility depend on temperature? Yes—17914628.*

Lee et al., Journal of Applied Polymer Science, (2006), v.102, p. 927-934.*

Lee, Wen-Fu et al, "Superabsorbent Polymeric Materials. XIII. Effect of Oxyethylene Chain Length on Water Absorbency for the Sodium Acrylate and Poly(ethylene glycol) Methyl Ether Acrylate (PEGMEAn) Copolymeric Gels;" Journal of Applied Polymer Science, vol. 102, Issue 1; Oct. 5, 2006; 8 pp.

China First Office Action and Search Report for Patent Application No. CN202080100948.8 dated Oct. 16, 2023; 12 pp.

Office Action for Korean application No. 10-2022-7040782, 14—pages.

Kabiri, Kourosh et al, Super Alcohol-Absorbent Gels of Sulfonic Acid-Contained Poly(Acrylic Acid); Journal of Polymer Research; vol. 18, Issue 3; May 2011; pp. 449-458.

Zhang, Yuhong, et al., Salt-Resistant Superabsorbents from Inverse-Suspension Polymerization of PEG Methacrylate, Acryamide, and Partially Neutralized Acrylic Acid; Journal of Polymer Research; vol. 18, Issue 2; Mar. 2011; pp. 157-161.

(Continued)

*Primary Examiner* — Yong L Chu

(74) *Attorney, Agent, or Firm* — Armstrong Teasdale LLP

(57) ABSTRACT

Described herein are superabsorbent polymers that are made of copolymers of charged monomer and neutral monomers, where the neutral monomers are alkyl or aryl end-capped neutral and hydrophilic monomers that lack free hydroxyl groups and have a water solubility of at least 200 mg/mL. The copolymer-based superabsorbent polymers have significantly improved absorbency under load. The compositions and methods described herein are useful in a variety of absorbent products.

16 Claims, 2 Drawing Sheets

(56) References Cited

OTHER PUBLICATIONS

Lee, Wen-Fu et al., Superabsorbant Polymeric Materials. XIII. Effect of Oxyethylene Chain Length on Water Absorbency for the Sodium Acrylate and Poly(Ethylene Glycol) Methyl Ether Acrylate (PEGMEAn) Copolymeric Gels; Department of Chemical Engineering, Tatung University, Taipei, Taiwan, Republic of China; Accepted Jan. 7, 2006; DOI 10.1002/app. 24068; pp. 927-934.
PCT International Preliminary Report of Patentability for Patent Application PCT/US2020/030618 mailed May 31, 2022; 7 pp.
Najafi, Vahid et al., Preparation and Characterization of Alcogels Based on (Poly Ethylene Glycol Methyl Ether Methacrylate-Acrylic Acid) Copolymers; Polymer-Plastics Technology and Engineering; vol. 52., pp. 667-673, 2013; DOI: 10.1080/03602559.2012.762664.
PCT International Search Report and Written Opinion for Patent Application PCT/US2020/030618 mailed Jan. 27, 2021; 14 pp.
Krieg, Andreas et al., Dual hydrophilic polymers based on (meth) acrylic acid and poly(ethylene glycol)—synthesis and water uptake behavior; Polymer Chemistry, 2010, vol. 1, pp. 1669-1676; DOI: 10.1039/c0copy00156b.

* cited by examiner

SUPERABSORBENT POLYMERS BASED ON COPOLYMERS OF CHARGED MONOMERS AND NEUTRAL MONOMERS

CROSS-REFERENCE TO RELATED APPLICATIONS

This application is a U.S. National Phase Application of International Patent Application No. PCT/US2020/030618, filed Apr. 30, 2020, the contents of which are hereby expressly incorporated by reference in their entirety.

FIELD OF DISCLOSURE

This disclosure is directed to superabsorbent polymers that are made of copolymers of charged monomer and neutral monomers, where the neutral monomers are alkyl or aryl end-capped neutral and hydrophilic monomers that lack free hydroxyl groups and have a water solubility of at least 200 mg/mL. The copolymer-based superabsorbent polymers have significantly improved absorbency under load. Compositions and methods in accordance with the present disclosure are useful in a variety of absorbent products.

BACKGROUND

Superabsorbent polymers (SAPs) are three-dimensional networks that can absorb and retain water (or other aqueous media) and physiological fluids such as urine and blood more than hundreds times of their own dry weight, typically depending on the ionic concentration of the aqueous solution. SAPs have applications in a variety of fields, including medicine, personal care products, biomaterials, biosorbents, and agriculture. The first commercial SAPs were produced in 1970 through the alkaline hydrolysis of starch-g-polyacrylonitrile. While these polymers could absorb up to 500 g/g of water, they were mechanically weak in their swollen state. SAPs were industrially developed in Japan and USA in the early 1980s for hygienic applications. It was found that SAPs had the potential to replace fluff, making their use in hygienic products such as baby diapers and feminine napkins cost effective.

Desired features of SAPs include high absorption capacity, high and tunable swelling rate, high absorbency under load, good strength of the swollen gel, high gel fraction after crosslinking, excellent durability and stability upon swelling and during storage, non-toxicity, and low cost. Although current hydrogel systems offer good performance in several of these different aspects, several drawbacks exist with various formulations, including low absorbency under pressure, gel blockage (by which the initial layer of SAP forms a relatively impermeable barrier to subsequent water diffusion and uptake deeper into the material), and high sensitivity to the electrolyte solutions. Various strategies have been employed to address these challenges, including forming composite and nanocomposite hydrogels, interpenetrating polymer network (IPN) hydrogels, and various surface treatments; however, improvements are still required to enable the use of minimal material in a broadest possible range of applications.

The nature of monomers and crosslinkers, their concentrations, and molar ratios are known as the most significant factors influencing the absorption capacity of a SAP. Acrylic acid, acrylamide and methacrylic acid are the most extensively used monomers to prepare SAPs commercially. However, the potential presence of some residual acrylamide in the gels poses a challenge in the practical use of such hydrogels for human health and personal care products. Conversely, the water absorbing and swelling properties of ionic SAPs (e.g. based on acrylic acid or methacrylic acid) are substantially decreased in salt-containing liquids, including physiological fluids like urine and blood. The reason for this salt sensitivity is that the counterions such as sodium ions ($Na^+$) present in physiological fluids can effectively screen the polymer backbone charges, resulting in counterion condensation with polymer-bound charged groups and, consequently, reduced counterion entropy and direct chain-chain repulsion forces available to drive a swelling response.

A number of strategies have been developed for SAPs to attempt to address some of these challenges.

As a representative example of approaches in the area of zwitterionic copolymer SAPs, Kabiri et al. reported the synthesis of hydrogels based on the zwitterionic monomer [3-(methacrylamido) propyl] dimethyl (3-sulfopropyl) ammonium hydroxide (MPDSAH) and 2-acrylamido-2-methylpropane sulfonic acid (AMPS) through solution polymerization (Kabiri et al., *Polym Adv Technol* 2005; 16, 659-666). Free swelling in water was increased from 2.3 gig for the AMPS-free sample to a maximum swelling of 212.3 gig with 20 mol % AMPS, above which swelling was again depressed. In 0.9% saline solution the lowest swelling 12.6 g/g corresponded to the AMPS-free sample, with swelling increasing to 32.8 g/g upon incorporation of 20 mol % AMPS. Due to the zwitterionic nature of the SAP, the swelling of the hydrogels is relatively pH independent over a wide range of pH values; similar near-constant swelling was also observed in environments with various ionic strengths. However, the absorbance under load (AUL) was not measured and using a zwitterionic monomer as the primary monomer would introduce substantially higher costs to producing SAN for commercial products.

As a representative example of approaches in the area of nanocomposite SAPs, Chen et al. synthesized superabsorbent hydrogels by solution copolymerization of partially neutralized acrylic acid and AMPS in the presence of the hydrophilic nano-sized clay Laponite XLG to improve the shape stability and mechanical properties of the gels (Chen et al., *Appl Mech Mater* 2013; 427-429: 364-367). Free swelling was observed to increase significantly with the increase of AMPS, with the free swelling ratio increasing from 460 g/g dried gel for AA-only hydrogels to 750 g/g dried gel when the mole ratio of AMPS:AA was 1. Further small improvements in water binding as well as substantial improvements in gel shape stability were observed upon the incorporation of clay up to 20 wt % total monomer content, consistent with a balance between adding a highly charged and hygroscopic filler (increased sorption capacity) and introducing physical crosslinks into the system (decreased sorption capacity). However, the interactions between nanoscale fillers and bulk gels are challenging to engineer, with the balance between higher gel-filler interactions (increased physical crosslinking and thus reduced swelling) and lower gel-filler interactions (filler aggregation) critical to control to achieve the desired combination of higher strength and high swelling.

It is known that saline-absorbency under load (AUL) can be improved through surface crosslinking reactions between the functional groups of SAPs and suitable surface crosslinking agents. Surface crosslinking helps improve the local mechanics of the SAP particles at the particle surface while also reducing the "gel blockage" often observed with swollen particles that poses a transport challenge for water to access the SAP deeper within the SAP mat. Generally, higher crosslinking densities at the surface of SAP particles impart better AUL properties. Bifunctional compounds like diglycidyls and diols are mostly employed for the SAP surface treatment. Epoxy silane compounds, such as 3-glycidopropoxytrimethoxy silane (GPS) have been also used for surface modification of SAPs. This compound can increase the AUL through two mechanisms: reaction of carboxylic acid with the epoxy group of GPS and oligomerization of siloxanes on the SAP particle surface. However, surface crosslinking introduces an additional processing step and can increase the amount of leachable compounds from SAPs unless the residual crosslinker is thoroughly removed from the hydrogels.

It is also known that multifunctional crosslinkers can be used not only enhance mechanical strength but also introduce other advantages to the SAP owing to their branched structures. For example, Ghasri et al. synthesized glycerol-lactic acid-based star-shaped modifier (SM) for the surface modification of hygienic SAP hydrogels to increase the saline-AUL and the swollen gel strength. Implementing the surface treatment leads to an AUL increase of up to 28% in the modified SAP (M. Ghasri et al., *Polym Adv Technol.,* 2018; 1-10). The modified samples showed lower salt sensitivity factor (f) in NaCl (f=0.7) and $CaCl_2$ (f=0.93-0.95) compared with the intact SAP (f=0.84 for NaCl, and f=0.95-0.97 for $CaCl_2$), attributed to the chelating effect induced by such multi-functional modifiers. Deionized water free swelling capacity of the intact SAP was approximately 366 g/g; however, surface crosslinking of the SAPs with $S_{11}$ (SMs containing one LA molecule in each arm) led to a reduction in the $Q_{DW}$ values (decreased to 249 and 219 g/g using 0.5 g and 1.5 g of the crosslinker, respectively). Thus, surface crosslinking with branched crosslinkers improved the AUL but not the free water binding capacity of the hydrogel. The branched crosslinkers were also synthetically more complex and expensive to prepare, a key consideration for commodity use applications in a disposable product such as sanitary pads or diapers.

As an alternative to these strategies, the present work discloses rational engineering of the structures of the polymers comprising SAPs to optimize the number of residues in the SAPs that are ionized and thus can induce Donnan equilibrium/direct chain repulsion.

Conventional superabsorbent materials (SAMs) are mainly made of two classes of polymers: synthetic polymers and natural polymers. In general, synthetic superabsorbent polymers are charged polyelectrolytes such as salts of polyacrylic acid (PAA), polyvinyl sulfonic acid, polyvinyl phosphoric acid, and partially hydrolyzed maleic anhydride copolymers. Natural polymers include both neutral and charged polymers such as carboxymethylcellulose, sodium alginate, chitosan salt and modified starch. All of these known SAMs have substantial limitations. For instance, the most widely used commercial PAA-based SAMs have limited absorbency under load (AUL) and are also very salt-sensitive.

Even though copolymers of charged monomers and neutral monomers are known for many applications such as drug delivery and tissue engineering, they are generally considered not to be ideal to serve as superabsorbent materials. Conventional wisdom is that introducing neutral monomers to replace charged monomers other than zwitterionic monomers in copolymer based SAMs will diminish absorbency because charged species or moieties are considered to have more driving force than neutral species or moieties to provide osmotic pressure and electric repulsion.

Furthermore, alkyl or aryl moieties are considered to be hydrophobic and not water friendly. To provide more hydrophilic character, alkyl moieties are often terminated with hydroxyl groups.

Surprisingly, it was found in the present work that the presence of hydroxyl groups is detrimental to the properties and performance of SAM particles. It was also surprisingly found that introducing neutral monomeric units into SAMs reduces salt sensitivity compared to charged polyelectrolytes without neutral monomeric units.

These findings are applicable to a variety of homopolyelectrolyte-based SAM systems. Homopolyeclectrolyte-based SAMs are very sensitive to salts, which results in lower absorbency for aqueous liquids containing high concentration of salts.

Described herein am SAMs that are made of copolymers of charged monomer and neutral monomers, where the neutral monomers are alkyl or aryl end-capped neutral and hydrophilic monomers that lack free hydroxyl groups and have a water solubility of at least 200 mg/mL. The copolymer-based SAM particles have significantly improved absorbency under load.

Compositions and methods in accordance with the present disclosure are useful in a variety of absorbent products.

OBJECTIVE OF THE DISCLOSURE

The aim of the present disclosure is to address the low ionization levels of AA-based SAPs by creating non-labile charged superabsorbent structures mixing charged comonomers with non-ionic monomers. The permanent charge on such materials, coupled with the potential to bind water through multiple mechanisms, can improve absorbency over a broad range of solution conditions.

BRIEF DESCRIPTION OF THE DISCLOSURE

In one aspect, provided herein is a superabsorbent polymer comprising
- a copolymer comprising
  - a major portion of charged monomers;
  - a minor portion of alkyl or aryl end-capped neutral and hydrophilic monomers; and
- optionally a crosslinker;
- wherein the alkyl or aryl end-capped neutral and hydrophilic monomers lack fre hydroxyl groups and have a water solubility of at least 200 mg/mL.

In another aspect, provided herein is a method of making a superabsorbent polymer comprising
- a copolymer comprising
  - a major portion of charged monomers;
  - a minor portion of alkyl or aryl end-capped neutral and hydrophilic monomers; and
- optionally a crosslinker;
- wherein the alkyl or aryl end-capped neutral and hydrophilic monomers lack free hydroxyl groups and have a water solubility of at least 200 mg/mL, the method comprising
- forming a mixture comprising
  - a solvent
  - a charged monomer;
  - an alkyl or aryl end-capped neutral and hydrophilic monomer; and
  - optionally a crosslinker initiating a reaction; and
- reacting the mixture.

In yet another aspect, provided herein is a method of using a superabsorbent polymer comprising a copolymer comprising a major portion of charged monomers;

a minor portion of alkyl or aryl end-capped neutral and hydrophilic monomers; and optionally a crosslinker;

wherein the alkyl or aryl end-capped neutral and hydrophilic monomers lack free hydroxyl groups and have a water solubility of at least 200 mg/mL, the method comprising using the superabsorbent polymer in a consumer product.

DETAILED DESCRIPTION OF THE DISCLOSURE

Figure 1:
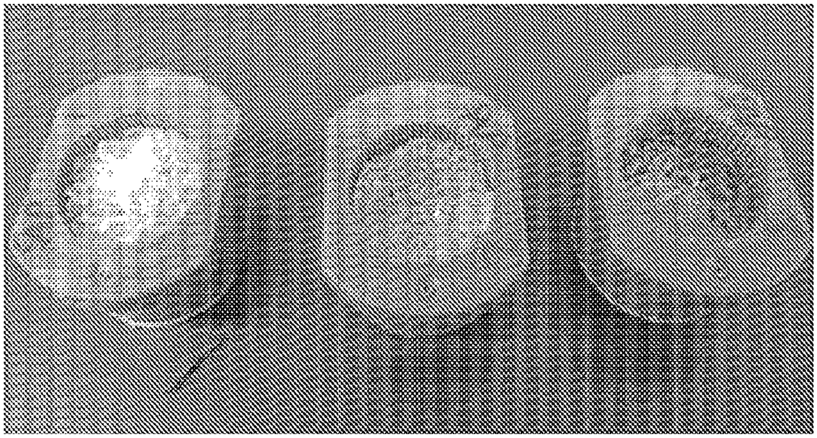
FIG. 1 is an exemplary embodiment depicting AMPS-co-PEGMMA samples in accordance with the present disclosure after swelling compared to a commercial (surface-crosslinked) sample and a control (AA only, no surface crosslinking) sample.

Superabsorbent polymers according to the present disclosure comprise a copolymer comprising a major portion of charged monomers, a minor portion of alkyl or aryl end-capped neutral and hydrophilic monomers, and optionally a crosslinker. The alkyl or aryl end-capped neutral and hydrophilic monomers lack free hydroxyl groups and have a water solubility of at least 200 mg/mL.

In some embodiments, the copolymer comprises two or more different species of monomers. In some embodiments, the copolymer comprises three or more different species of monomers. In some embodiments, the copolymer comprises four or more different species of monomers. In some embodiments, the copolymer comprises five or more different species of monomers. In some embodiments, the copolymer comprises six or more different species of monomers.

In some embodiments, the copolymer comprises one or more different species of charged monomers. In some embodiments, the copolymer comprises two or more different species of charged monomers. In some embodiments, the copolymer comprises three or more different species of charged monomers.

In some embodiments, the copolymer comprises one or more different species of alkyl or aryl end-capped neutral and hydrophilic monomers. In some embodiments, the copolymer comprises two or more different species of alkyl or aryl end-capped neutral and hydrophilic monomers. In some embodiments, the copolymer comprises three or more different species of alkyl or aryl end-capped neutral and hydrophilic monomers.

In some embodiments, the copolymer lacks structured ordering of the charged monomers and the alkyl or aryl end-capped neutral and hydrophilic monomers. In some embodiments, the copolymer is as random as possible. In some embodiments, the probability of finding a given type of monomer residue at a particular point along the polymer backbone is about equal to the mole fraction of that monomer residue in the polymer backbone.

In some embodiments, the copolymer does not comprise a block copolymer of the charged monomers and the alkyl or aryl end-capped neutral and hydrophilic monomers. In some embodiments, the copolymer does not comprise an alternating copolymer of the charged monomers and the alkyl or aryl end-capped neutral and hydrophilic monomers. In some embodiments, the copolymer does not comprise a graft copolymer of the charged monomers, the alkyl or aryl end-capped neutral and hydrophilic monomers.

In some embodiments, the major portion is present in an amount greater than about 50 mol %, greater than about 51 mol %, greater than about 52 mol %, greater than about 53 mol %, greater than about 54 mol %, greater than about 55 mol %, greater than about 56 mol %, greater than about 57 mol %, greater than about 58 mol %, greater than about 59 mol %, greater than about 60 mol %, greater than about 61 mol %, greater than about 62 mol %, greater than about 63 mol %, greater than about 64 mol %, greater than about 65 mol %, greater than about 66 mol %, greater than about 67 mol %, greater than about 68 mol %, greater than about 69 mol %, greater than about 70 mol %, greater than about 71 mol %, greater than about 72 mol %, greater than about 73 mol %, greater than about 74 mol %, greater than about 75 mol %, greater than about 76 mol %, greater than about 77 mol %, greater than about 78 mol %, greater than about 79 mol %, greater than about 80 mol %, greater than about 81 mol %, greater than about 82 mol %, greater than about 83 mol %, greater than about 84 mol %, greater than about 85 mol %, greater than about 86 mol %, greater than about 87 mol %, greater than about 88 mol %, greater than about 89 mol %, greater than 90 mol %, greater than about 91 mol %, greater than about 92 mol %, greater than about 93 mol %, greater than about 94 mol %, or greater than about 95 mol % of the copolymer.

In some embodiments, the major portion is present in an amount greater than about 65 wt % of the copolymer.

In some embodiments, the minor portion is present in an amount greater than about 5 mol %, greater than about 6 mol %, greater than about 7 mol %, greater than about 8 mol %, greater than about 9 mol %, greater than about 10 mol %, greater than about 11 mol %, greater than about 12 mol %, greater than about 13 mol %, greater than about 14 mol %, greater than about 15 mol %, greater than about 16 mol %, greater than about 17 mol %, greater than about 18 mol %, greater than about 19 mol %, greater than about 20 mol %, greater than about 21 mol %, greater than about 22 mol %, greater than about 23 mol %, greater than about 24 mol %, greater than about 25 mol %, greater than about 26 mol %, greater than about 27 mol %, greater than about 28 mol %, greater than about 29 mol %, greater than about 30 mol %, greater than about 31 mol %, greater than about 32 mol %, greater than about 33 mol %, greater than about 34 mol %, greater than about 35 mol %, greater than about 36 mol %, greater than about 37 mol %, greater than about 38 mol %, greater than about 39 mol %, greater than about 40 mol %, greater than about 41 mol %, greater than about 42 mol %, greater than about 43 mol %, greater than about mole wt %, greater than about mole wt %, greater than about mole wt %, greater than about 47 mol %, greater than about 48 mol %, or greater than about 49 mol % of the copolymer.

In some embodiments, the minor portion is present in an amount less than about 5 mol %, less than about 6 mol %, less than about 7 mol %, less than about 8 mol %, less than about 9 mol %, less than about 10 mol %, less than about 11 mol %, less than about 12 mol %, less than about 13 mol %, less than about 14 mol %, less than about 15 mol %, less than about 16 mol %, less than about 17 mol %, less than about 18 mol %, less than about 19 mot %, less than about 20 mol %, less than about 21 mol %, less than about 22 mol %, less than about 23 mol %, less than about 24 mol %, less than about 25 mol %, less than about 26 mol %, less than about 27 mol %, less than about 28 mot %, less than about 29 mol %, less than about 30 mol %, less than about 31 mol %, less than about 32 mol %, less than about 33 mol %, less than about 34 mol %, less than about 35 mol %, less than about 36 mol %, less than about 37 mol %, less than about 38 mol %, less than about 39 mol %, less than about 40 mol %, less than about 41 mol %, less than about 42 mol %, less than about 43 mol %, less than about 44 mol %, less than about 45 mol %, less than about 46 mol %, less than about 47 mol %, less than about 48 mol %, or less than about 49 mol % of the copolymer.

In some embodiments, the minor portion is present in an amount less than about 35 mol % of the copolymer.

In some embodiments, the major portion is present in an amount greater than about 50 mol % of the copolymer and the minor portion is present in an amount less than about 50 mol % of the copolymer. In some embodiments, the major portion is present in an amount greater than about 55 mol % of the copolymer and the minor portion is present in an amount less than about 45 mol % of the copolymer. In some embodiments, the major portion is present in an amount greater than about 60 mol % of the copolymer and the minor portion is present in an amount less than about 40 mol % of the copolymer. In some embodiments, the major portion is present in an amount greater than about 65 mol % of the copolymer and the minor portion is present in an amount less than about 35 mol % of the copolymer. In some embodiments, the major portion is present in an amount greater than about 70 mol % of the copolymer and the minor portion is present in an amount less than about 30 mol % of the copolymer. In some embodiments, the major portion is present in an amount greater than about 75 mol % of the copolymer and the minor portion is present in an amount less than about 25 mol % of the copolymer. In some embodiments, the major portion is present in an amount greater than about 80 mol % of the copolymer and the minor portion is present in an amount less than about 20 mol % of the copolymer. In some embodiments, the major portion is present in an amount greater than about 85 mol % of the copolymer and the minor portion is present in an amount less than about 15 mol % of the copolymer. In some embodiments, the major portion is present in an amount greater than about 90 mol % of the copolymer and the minor portion is present in an amount less than about 10 mol % of the copolymer. In some embodiments, the major portion is present in an amount greater than about 95 mol % of the copolymer and the minor portion is present in an amount less than about 5 mol % of the copolymer.

In some embodiments, the major portion is present in an amount greater than about 65 mol % of the copolymer and the minor portion is present in an amount less than about 35 mol % of the copolymer.

In some embodiments, the superabsorbent polymer is in a form selected from the group consisting of a particle, a gel, a fiber, a bead, a liquid, a solid, a paste, or combinations thereof. In some embodiments, the superabsorbent polymer is a gel. In some embodiments, the superabsorbent polymer is a particle.

In some embodiments, the superabsorbent polymer is in a form with a diameter in the range of about 100 μm to about 1000 μm, about 100 μm to about 900 μm, about 100 μm to about 800 μm, about 100 μm to about 700 μm, about 100 μm to about 600 μm, about 100 μm to about 500 μm, about 100 μm to about 400 μm, about 100 μm to about 300 μm, or about 100 μm to about 200 μm. In some embodiments, the superabsorbent polymer is in a form with a diameter in the range of about 200 μm to about 900 μm, about 300 μm to about 800 μm, about 400 μm to about 700 μm, or about 500 μm to about 600 μm.

In some embodiments, the superabsorbent polymer is in a form with a diameter in the range of about 300 μm to about 600 μm.

In some embodiments, the superabsorbent polymer is a particle with a diameter in the range of about 100 μm to about 1000 μm. In some embodiments, the superabsorbent polymer is a particle with a diameter in the range of about 300 μm to about 600 μm.

In some embodiments, the superabsorbent polymer does not comprise a crosslinker. In some embodiments, the superabsorbent polymer comprises one or more cross-linkers. In some embodiments, the superabsorbent polymer comprises two or more cross-linkers.

In some embodiments, the superabsorbent polymer comprises a crosslinker selected from the group consisting of methylene(bis) acrylamide (MBAA), poly(ethylene glycol diacrylate) (PEGDA), ethylene glycol diacrylate (EGDA), ethylene glycol dimethacrylate (EGDMA), poly(ethylene glycol dimethacrylate) (PEGDMA), and combinations thereof.

In some embodiments, the superabsorbent polymer is lightly crosslinked. In some embodiments, the superabsorbent polymer has a crosslinker density in the range of about 0.1 mol % to about 1 mol %. In some embodiments, the superabsorbent polymer has a crosslinker density in the range of about 0.2 mol % to about 1 mol %.

In some embodiments, the superabsorbent polymer is surface-crosslinked.

In some embodiments, the minor portion of alkyl or aryl end-capped neutral and hydrophilic monomers comprises an alkyl or aryl end-capped neutral and hydrophilic monomer having a water solubility greater than about 200 mg/mL. In some embodiments, the minor portion of alkyl or aryl end-capped neutral and hydrophilic monomers comprises an alkyl or aryl end-capped neutral and hydrophilic monomer having a water solubility greater than about 250 mg/mL. In some embodiments, the minor portion of alkyl or aryl end-capped neutral and hydrophilic monomers comprises an alkyl or aryl end-capped neutral and hydrophilic monomer having a water solubility greater than about 300 mg/mL. In some embodiments, the minor portion of alkyl or aryl end-capped neutral and hydrophilic monomers comprises an alkyl or aryl end-capped neutral and hydrophilic monomer having a water solubility greater than about 350 mg/mL. In some embodiments, the minor portion of alkyl or aryl end-capped neutral and hydrophilic monomers comprises an alkyl or aryl end-capped neutral and hydrophilic monomer having a water solubility greater than about 400 mg/mL. In some embodiments, the minor portion of alkyl or aryl end-capped neutral and hydrophilic monomers comprises an alkyl or aryl end-capped neutral and hydrophilic monomer having a water solubility greater than about 450 mg/mL. In some embodiments, the minor portion of alkyl or aryl end-capped neutral and hydrophilic monomers comprises an alkyl or aryl end-capped neutral and hydrophilic monomer having a water solubility greater than about 500 mg/mL.

In some embodiments, the minor portion of alkyl or aryl end-capped neutral and hydrophilic monomers comprises an alkyl or aryl end-capped neutral and hydrophilic monomer having a water solubility in the range of about 200 mg/mL to about 500 mg/mL.

In some embodiments, the major portion of charged monomers comprises a charged monomer having a molecular weight less than about 150 g/mol. In some embodiments, the major portion of charged monomers comprises a charged monomer having a molecular weight less than about 125 g/mol. In some embodiments, the major portion of charged monomers comprises a charged monomer having a molecular weight less than about 100 g/mol. In some embodiments, the major portion of charged monomers comprises a charged monomer having a molecular weight less than about 75 g/mol. In some embodiments, the major portion of charged monomers comprises a charged monomer having a molecular weight less than about 50 g/mol. In some embodiments, the major portion of charged monomers comprises a charged monomer having a molecular weight less than about 25 g/mol.

In some embodiments, the minor portion of alkyl or aryl end-capped neutral and hydrophilic monomers comprises an alkyl or aryl end-capped neutral and hydrophilic monomer having a molecular weight greater than about 150 g/mol. In some embodiments, the minor portion of alkyl or aryl end-capped neutral and hydrophilic monomers comprises an alkyl or aryl end-capped neutral and hydrophilic monomer having a molecular weight greater than about 200 g/mol. In some embodiments, the minor portion of alkyl or aryl end-capped neutral and hydrophilic monomers comprises an alkyl or aryl end-capped neutral and hydrophilic monomer having a molecular weight greater than about 250 g/mol. In some embodiments, the minor portion of alkyl or aryl end-capped neutral and hydrophilic monomers comprises an alkyl or aryl end-capped neutral and hydrophilic monomer having a molecular weight greater than about 300 g/mol. In some embodiments, the minor portion of alkyl or aryl end-capped neutral and hydrophilic monomers comprises an alkyl or aryl end-capped neutral and hydrophilic monomer having a molecular weight greater than about 350 g/mol. In some embodiments, the minor portion of alkyl or aryl end-capped neutral and hydrophilic monomers comprises an alkyl or aryl end-capped neutral and hydrophilic monomer having a molecular weight greater than about 400 g/mol. In some embodiments, the minor portion of alkyl or aryl end-capped neutral and hydrophilic monomers comprises an alkyl or aryl end-capped neutral and hydrophilic monomer having a molecular weight greater than about 450 g/mol. In some embodiments, the minor portion of alkyl or aryl end-capped neutral and hydrophilic monomers comprises an alkyl or aryl end-capped neutral and hydrophilic monomer having a molecular weight greater than about 500 g/mol.

In some embodiments, the minor portion of alkyl or aryl end-capped neutral and hydrophilic monomers comprises an alkyl or aryl end-capped neutral and hydrophilic monomer having a molecular weight less than about 1500 g/mol. In some embodiments, the minor portion of alkyl or aryl end-capped neutral and hydrophilic monomers comprises an alkyl or aryl end-capped neutral and hydrophilic monomer having a molecular weight less than about 1000 g/mol. In some embodiments, the minor portion of alkyl or aryl end-capped neutral and hydrophilic monomers comprises an alkyl or aryl end-capped neutral and hydrophilic monomer having a molecular weight less than about 900 g/mol. In some embodiments, the minor portion of alkyl or aryl end-capped neutral and hydrophilic monomers comprises an alkyl or aryl end-capped neutral and hydrophilic monomer having a molecular weight less than about 800 g/mol. In some embodiments, the minor portion of alkyl or aryl end-capped neutral and hydrophilic monomers comprises an alkyl or aryl end-capped neutral and hydrophilic monomer having a molecular weight less than about 700 g/mol. In some embodiments, the minor portion of alkyl or aryl end-capped neutral and hydrophilic monomers comprises an alkyl or aryl end-capped neutral and hydrophilic monomer having a molecular weight less than about 600 g/mol. In some embodiments, the minor portion of alkyl or aryl end-capped neutral and hydrophilic monomers comprises an alkyl or aryl end-capped neutral and hydrophilic monomer having a molecular weight less than about 500 g/mol. In some embodiments, the minor portion of alkyl or aryl end-capped neutral and hydrophilic monomers comprises an alkyl or aryl end-capped neutral and hydrophilic monomer having a molecular weight less than about 400 g/mol. In some embodiments, the minor portion of alkyl or aryl end-capped neutral and hydrophilic monomers comprises an alkyl or aryl end-capped neutral and hydrophilic monomer having a molecular weight less than about 300 g/mol. In some embodiments, the minor portion of alkyl or aryl end-capped neutral and hydrophilic monomers comprises an alkyl or aryl end-capped neutral and hydrophilic monomer having a molecular weight less than about 200 g/mol. In some embodiments, the minor portion of alkyl or aryl end-capped neutral and hydrophilic monomers comprises an alkyl or aryl end-capped neutral and hydrophilic monomer having a molecular weight less than about 100 g/mol.

In some embodiments, the minor portion of alkyl or aryl end-capped neutral and hydrophilic monomers comprises an alkyl or aryl end-capped neutral and hydrophilic monomer having a molecular weight less than about 1000 g/mol.

In some embodiments, the major portion of charged monomers comprises a charged monomer having a molecular weight less than about 150 g/mol and the minor portion of alkyl or aryl end-capped neutral and hydrophilic monomers comprises an alkyl or aryl end-capped neutral and hydrophilic monomer having a molecular weight greater than about 150 g/mol.

In some embodiments, the major portion of charged monomers comprises a charged monomer having 1, 2, 3, 4, 5, 6, 7, 8, 9, or 10 carbon atoms. In some embodiments, the major portion of charged monomers comprises a charged monomer having 3, 4, 5, 6, 7, 8, 9, or 10 carbon atoms. In some embodiments, the major portion of charged monomers comprises a charged monomer having 1, 2, 3, 4, 5, or 6 oxygen atoms. In some embodiments, the major portion of charged monomers comprises a charged monomer having 2, 3, 4, 5, or 6 oxygen atoms.

In some embodiments, the minor portion of alkyl or aryl end-capped neutral and hydrophilic monomers comprises an alkyl or aryl end-capped neutral and hydrophilic monomer having 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, or 54 carbon atoms. In some embodiments, the minor portion of alkyl or aryl end-capped neutral and hydrophilic monomers comprises an alkyl or aryl end-capped neutral and hydrophilic monomer having 6, 7, 8, 9, 10, 11, 12, 13, 14, 15, 16, 17, 18, 19, 20, 21, 22, 23, 24, 25, 26, 27, 28, 29, or 30 carbon atoms. In some embodiments, the minor portion of alkyl or aryl end-capped neutral and hydrophilic monomers comprises an alkyl or aryl end-capped neutral and hydrophilic monomer having 1, 2, 3, 4, 5, 6, 7, 8, 9, 10, 11, 12, 13, 14, or 15 oxygen atoms. In some embodiments, the minor portion of alkyl or aryl end-capped neutral and hydrophilic monomers comprises an alkyl or aryl end-capped neutral and hydrophilic monomer having has 4, 5, 6, 7, 8, 9, 10, 11, 12, 13, 14, or 15 oxygen atoms.

In some embodiments, the major portion of charged monomers comprises a charged monomer having a net negative charge. In some embodiments, the major portion of charged monomers comprises a charged monomer having a net positive charge.

In some embodiments, the major portion of charged monomers comprises a charged monomer having one negative or positive charge. In some embodiments, the major portion of charged monomers comprises a charged monomer having two negative or positive charges. In some embodiments, the major portion of charged monomers comprises a charged monomer having three negative or positive charges. In some embodiments, the major portion of charged monomers comprises a charged monomer having more than three negative or positive charges.

In some embodiments, the minor portion of alkyl or aryl end-capped neutral and hydrophilic monomers comprises an alkyl or aryl end-capped neutral and hydrophilic monomer having no net charge.

In some embodiments, the minor portion of alkyl or aryl end-capped neutral and hydrophilic monomers comprises an alkyl or aryl end-capped neutral and hydrophilic monomer that is selected from the group consisting of polyethylene glycol monomethylether monomethacrylate, methoxy ethyl acrylate, compounds according to Formula 1:

(Formula I)

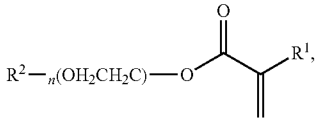

wherein n is a number in the range of 1-50 and $R^1$ and $R^2$ are each independently selected from the group consisting of hydrogen and linear or branched $C_1$-$C_6$ alkyl groups.

In some embodiments, n is a number in the range of 1-20. In some embodiments, n is a number in the range of 1-10.

In some embodiments, $R^1$ is selected from the group consisting of hydrogen and methyl.

In some embodiments, $R^2$ is selected from the group consisting of linear or branched $C_1$-$C_3$ alkyl groups.

In some embodiments, the major portion of charged monomers comprises a charged monomer that is selected from the group consisting of acrylic acid or methacrylic acid or salts thereof, 2-acrylamido-2-methylpropane sulfonic acid, 3-sulfopropyl methacrylate, 3-sulfopropyl acrylate, acrylate or methacrylate monomers with tethered sulfate groups or salts thereof, salts of vinyl-linker-acid units, salts of vinyl-linker-acid units where the linker has a length of at least 3 angstroms, vinylic sulfate monomers, salts of acrylic acid, vinyl sulfonic acid, vinyl phosphoric acid, partially hydrolyzed maleic anhydride monomers, and combinations thereof.

In some embodiments, the major portion of charged monomers comprises a charged monomer that is selected from the group consisting of salts of acrylic acid, vinyl sulfonic acid, vinyl phosphoric acid, partially hydrolyzed maleic anhydride monomers, and combinations thereof.

In some embodiments, the copolymer does not comprise a zwitterionic charged monomer. In some embodiments, the copolymer does not comprise a nonionic monomer.

In some embodiments, the copolymer is synthesized according to a method selected from the group consisting of free radical polymerization, anionic polymerization, controlled radical polymerization methods, atom-transfer radical-polymerization (ATRP), nitroxide mediated radical polymerization (NMP), reversible addition-fragmentation chain-transfer polymerization (RAFT), and combinations thereof. In some embodiments, the copolymer is synthesized according to free radical polymerization.

In some embodiments, free radicals may be generated by photolysis, thermal decomposition, or ambient redox conditions.

In some embodiments, the copolymer is synthesized according to a method comprising forming a mixture comprising a solvent, a charged, an alkyl or aryl end-capped neutral and hydrophilic monomer, and optionally a cross-linker; initiating a redox reaction; and reacting the mixture.

In some embodiments, the method step of initiating a redox reaction comprises adding a redox initiator, an accelerator, or a combination thereof to the mixture.

In some embodiments, the initiator is an organic compound. In some embodiments, the initiator is selected from the group consisting of azo compounds, organic peroxide compounds, organic persulfate compounds, and combinations thereof. In some embodiments, the initiator is an azo compound. In some embodiments, the initiator is an organic peroxide compound. In some embodiments, the initiator is an organic persulfate compound.

In some embodiments, the initiator is an inorganic compound. In some embodiments, the initiator is selected from the group consisting of inorganic peroxide compounds, metal reductants, iron, chromium, vanadium, titanium, cobalt, copper, and combinations thereof. In some embodiments, the initiator is an inorganic peroxide compound. In some embodiments, the initiator is selected from the group consisting of potassium persulfate, ammonium persulfate, and combinations thereof. In some embodiments, the reduction of hydrogen peroxide or an alkyl hydrogen peroxide can happen by iron or other reductants such as $Cr^{2+}$, $V^{2+}$, $Ti^{3+}$, $Co^{2+}$, or $Cu^{+}$.

In some embodiments, the initiator is an oxidizing agent. In some embodiments, the initiator is a persulfate. In some embodiments, the initiator is selected from the group consisting of potassium persulfate, ammonium persulfate, and combinations thereof.

In some embodiments, the accelerator is an organic compound. In some embodiments, the accelerator is an organic base. In some embodiments, the accelerator is tetramethylethylenediamine (TEMED). In other embodiments, the accelerator is sodium metabisulfite (SPS). In some embodiments, no accelerator is used. In some embodiments, the accelerator is selected from the group consisting of organic compounds, organic bases, TEMED, SPS, no accelerator, and combinations thereof.

In some embodiments, the method step of reacting the mixture comprises reacting the mixture in an inert atmosphere. In some embodiments, the method step of reacting the mixture comprises reacting the mixture in a static inert atmosphere. In some embodiments, the method step of reacting the mixture comprises reacting the mixture in a dynamic inert atmosphere. In some embodiments, the method step of reacting the mixture comprises reacting the mixture under a flow of an inert gas.

In some embodiments, the method step of reacting the mixture comprises reacting the mixture in an inert atmosphere selected from the group consisting of $N_2$, $CO_2$, noble gases, helium, neon, argon, krypton, xenon, and a combination thereof. In some embodiments, the method step of reacting the mixture comprises reacting the mixture in an inert atmosphere of $N_7$.

In some embodiments, the method step of reacting the mixture comprises heating the mixture. In some embodiments, the method step of reacting the mixture comprises heating the mixture to a temperature in the range of about 20° C. to about 100° C. In some embodiments, the method step of reacting the mixture comprises heating the mixture to a temperature in the range of about 30° C. to about 100° C. In some embodiments, the method step of reacting the mixture comprises heating the mixture to a temperature in the range of about 40° C. to about 100° C. In some embodiments, the method step of reacting the mixture comprises heating the mixture to a temperature in the range of about 50° C. to about 100° C. In some embodiments, the method step of reacting the mixture comprises heating the mixture to a temperature in the range of about 60° C. to about 100° C. In some embodiments, the method step of reacting the mixture comprises heating the mixture to a temperature in the range of about 70° C. to about 100° C. In some embodiments, the method step of reacting the mixture comprises heating the mixture to a temperature in the range of about 20° C. to about 90° C. In some embodiments, the method step of reacting the mixture comprises heating the mixture to a temperature in the range of about 30° C. to about 80° C. In some embodiments, the method step of reacting the mixture comprises heating the mixture to a temperature in the range of about 40° C. to about 70° C.

In some embodiments, the method step of reacting the mixture comprises heating the mixture to a temperature in the range of about 20° C. to about 40° C. In some embodiments, the method step of reacting the mixture comprises heating the mixture to about 40° C. In some embodiments, the method step of reacting the mixture comprises heating the mixture to about 70° C.

In some embodiments, the method further comprises drying the reaction product. In some embodiments, the method further comprises drying the reaction product in an oven. In some embodiments, the method further comprises drying the reaction product at a temperature in the range of about 50° C. to about 100° C. In some embodiments, the method further comprises drying the reaction product at a temperature in the range of about 60° C. to about 100° C. In some embodiments, the method further comprises drying the reaction product at a temperature in the range of about 70° C. to about 100° C. In some embodiments, the method further comprises drying the reaction product at a temperature in the range of about 80° C. to about 100° C. In some embodiments, the method further comprises drying the reaction product at a temperature in the range of about 60° C. to about 90° C. In some embodiments, the method further comprises drying the reaction product at a temperature in the range of about 70° C. to about 90° C.

In some embodiments, the method further comprises drying the reaction product at a temperature of about 85° C.

In some embodiments, the method further comprises grinding the reaction product. In some embodiments, the method further comprises grinding the reaction product with a grinding device selected from a mechanical blender, a coffee grinder, a crusher, a pulveriser, a grinder, a mill, and combinations thereof.

In some embodiments, the ability of a polymer to absorb fluid under a static load can be measured as absorbance under load (AUL). A typical AUL test format may be used.

In some embodiments, the capacity of a pre-swollen polymer to retain water under force can be measured as centrifuge retention capacity (CRC). A typical CRC test format may be used.

In some embodiments, the superabsorbent polymer is used in a consumer product or a superabsorbent material. In some embodiments, a consumer product or superabsorbent material comprises the superabsorbent polymer.

In some embodiments, a method of using a superabsorbent polymer comprises using the superabsorbent polymer in a consumer product or superabsorbent material.

In some embodiments, the consumer product is selected from the group consisting of cloth products, diapers, feminine napkins, and disposable bed liners.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

Materials.

Unless otherwise indicated, the following materials were used in the examples: Acrylic acid (AA), 99%; Acrylamido-2-methylpropane sulfonic acid (AMPS), 2-Hydroyethyl methacrylate (HEMA), 97%; Methoxyethyl acrylate (MEA); Vinylsulfonic acid sodium salt (VSA), 25% in water, technical grade; Poly (ethylene glycol) methyl ether methacrylate (PEGMMA), Mw=300-500 g/mol; Poly (ethylene glycol) methacrylate (PEGMA), Mn=360 g/mol; Poly (ethylene glycol) diacrylate (PEGDA), Mw=250; Ethylene glycol dimethacrylate (EGDMA), Mw=198.22 g/mol; Poly (ethylene glycol) dimethacrylate (PEGDMA). Mn=550 g/mol; Potassium persulfate (KPS), ≥99%; N,N-Methylene (bis)acrylamide (MBAA), ≥99%; and Ammonium persulfate (APS), ≥98%; N, N, N',N'-tetramethylethylenediamine (TEMED), ≥99.5%.

Comparative Example 1. Preparation of AA-Based SAM Particles 17 g milli-Q water was added to a tall 200 mL reaction flask and 1.94 g 97% NaOH pellets for 70% neutralization (or 2.08 g in case of 75% neutralization) were dissolved in an ice bath. 5 g AA (anhydrous, containing 200 ppm MEHQ as inhibitor, 99%) was added. 25 mg≥99% MBAA was dissolved in 2 mL water and added to the above solution. The solution was stirred with a magnetic stir bar at 600 rpm throughout reaction. The reaction flask was purged with $N_2$ gas for 10 mins and the temperature of the reaction was increased to 40° C. 15 mg APS, the redox initiator, was dissolved in 1 mL water and added to the reaction mixture along with 10 μL TEMED. The reaction flask was sealed by parafilm and kept under a low flow of $N_2$. Gelation started in 10-20 min. After gelation the reaction jar was capped and kept on 40° C. for 4 more hours. The gelled reaction product was cut into smaller pieces and dried at 85° C. for 48 hours. The dried sample was ground using a coffee grinder. The dried gel particle size fraction between 300-600 microns was separated using appropriate sieves and dried overnight.

Comparative Example 2. Preparation of AA 90%/PEGMMA 10% Based SAM Particles 14 g milli-Q water was added to a tall 200 mL beaker. 2.08 g of 97% NaOH pellets was dissolved in the water, on an ice bath. 4.5 g AA (anhydrous, containing 200 ppm MEHQ as inhibitor, 99%) was added. 2.07 g PEGMMA was mixed with 3 ml of milliQ water and added dropwise through a dropping funnel. 25 mg of >99% MBAA was completely dissolved in 2 mL water and added to the above solution. The solution was stirred with a magnetic stirrer at about 600 rpm throughout the reaction. The reaction flask was purged with $N_2$ gas for 5-10 mins and the temperature was increased to 40° C. 15 mg APS, the redox initiator, was dissolved in 1 mL water and added to the reaction mixture along with 40 μL TEMED. The reaction flask was sealed by parafilm and kept under a low flow of $N_2$. Gelation started in 5-15 min and the reaction jar was capped and kept on 40° C. for 4 more hours. The gelled reaction product was cut and dried in an oven at 85° C. for 48 hours. The dried sample was ground using a coffee grinder. The dried gel particle size fraction between 300-600 microns was separated using appropriate sieves and dried overnight.

Example 1. Preparation of AMPS/MEA and AMPS/HEMA-Based SAM Particles

Three bottles were designated as bottle 1, bottle 2, and bottle 3, respectively. 10 g, 8 g, and 8 g 2-Acrylamido-2-methylpropane sulfonic acid (AMPS) was added to bottles 1, 2, and 3, respectively. 1.121 g hydroxyethyl acrylate (HEA) was added to bottle 2. 1.256 g methoxyethyl acrylate (MEA) was added to bottle 3. 34 mL, 27.2 mL, and 27.2 mL of NaOH aqueous solution (0.05684 g/mL) was added to bottles 1, 2, and 3, respectively, in an ice bath. 6.8 mL water was added to each of bottles 2 and 3. The pH of the mixture in each bottle was adjusted to 6.5 by either NaOH solution or HCl solution. 2 mL of aqueous N,N'-Methylenebisacrylamide (MBAA) solution (8.695 mg/mL) was added to each bottle. The mixture in each bottle was purged with an $N_2$ stream for 15 min in an ice bath. Then, 2 mL of aqueous ammonium persulfate (APS) solution (17.39 mg/mL) was added to each bottle, followed by addition of 2 mL aqueous Tetramethylethylenediamine (TEMED) solution (13.9 μl/mL). The bottles were capped and transferred to a water bath of 40° C. under stirring. In general, hydrogels were formed after about 15 to 30 mins. The gels were further incubated at 40° C. for 4 hours. The gels from AMPS and AMPS/MEA were relatively rigid while the gel from AMPS/HEA was soft and sticky. The cured hydrogels were cut into small pieces and dried at 85° C. for 48 hours. The dried hydrogels were grinded with a food grinder and sieved into 300 to 600 um particles. Those particles are designated as AMPS, AMPS/HEA and AMPS/MEA from Bottle 1, 2 and 3, respectively.

Example 2. AUL Measurements of SAM Particles

AUL measures the ability of a polymer to absorb fluid under a static load and can be considered as a measurement of gel swelling coupled with gel strength. A typical AUL test format was used, consisting of a simple cylindrical device with a macro-porous sintered filter plate at one end of a sintered plastic cylinder. For the samples tested, 160 mg ($W_1$) of the dried SAP sample was weighed and evenly placed on the surface of polyester gauze placed on top of the sintered plastic. The desired load (0.3, 0.6, or 0.9 PSI) was then placed on top of the dry SAP particles, with the load designed so it can freely move in the plastic cylinder. The device was placed in a petri dish of 0.9% saline solution on the top of a mesh (to ensure that water can access the bottom of the sintered plastic) for 1 hour. The swollen sample was weighed ($W_2$), and the AUL was calculated using Equation (1)

$$AUL\left(\frac{g}{g}\right) = \frac{W_2 - W_1}{W_1}. \quad (1)$$

About 0.2 g of each SAM particle prepared according to Comparative Example 1, Comparative Example 2, and Example 1 was placed into an AUL measurement cup and covered with a lid and a steel cylinder of 100 g. The pressure on SAM particles was 0.3 PSI. The cups were placed into 0.9% saline for 24 hours. The absorbed water was weighed for each cup. AUL was then calculated by dividing the absorbed water by SAM particle weight. The 24 hours AUL of AMPS/MEA was about 15% higher than AMPS while AUL of AMPS/HEA was about 8% lower than AMPS.

These results demonstrate the improved AUL of SAM particles based on copolymers of AMPS/MEA compared to SAM particles based solely on AMPS and SAM particles based on copolymers of AMPS/HEA.

Example 3. Salt Sensitivity

Six AUL cups were divided into two groups. Each sample of the first group (3 cups) contained about 0.2 g AMPS SAM particles for AUL measurement under 0.3 PSI. Each sample of the second group (3 cups) contained about 0.2 g AMPS/MEA SAM particles for AUL measurement under 0.3 PSI. They were placed in an aqueous solution of different NaCl concentrations (0.225%, 0.45%, and 0.9%, respectively). The 3 hours AUL for AMPS SAM particles in 0.9% NaCl solution was 20% lower than the AUL in 0.225%. In contrast, the 3 hours AUL for AMPS/MEA SAM particles in 0.9% NaCl solution was 12% lower than the AUL in 0.225%.

These results demonstrate the reduced salt sensitivity of SAM particles based on copolymers of AMPS/MEA compared to SAM particles based solely on AMPS.

Example 4. Syntheses of Copolymer Compositions

A variety of new copolymer compositions were synthesized primarily by replacing a fraction of the AA and/or the AMPS (5, 10, 15, 20, 25 or 30 mole % of the total monomers present in the backbone) with different monomers to make copolymer hydrogels using a free radical polymerization reaction in water. Unless otherwise stated, the acrylic acid was partially neutralized (70%), N, N'-methylene(bis)acrylamide (99% purity) was used as the crosslinker (0.21-0.23 mol % to total monomer) and potassium persulfate (≥99.0% purity) was used as the thermal initiator (0.08-0.1 mol % to total monomer).

Each polymerization reaction was carried out according to the following procedure. A 200 mL glass reaction jar was immersed in an ice bath. NaOH pellets were dissolved in milli-Q water, and AA or AMPS was added. For each series of reactions, a stock solution of defined concentration of crosslinker (10 mg/ml) and (20 mg/ml) was made freshly prior to each synthesis. The desired amount of crosslinker was added to each reaction mixture. The reaction mixture was purged with nitrogen for 5-10 minutes and the temperature was increased to 40° C. The beaker was sealed and kept under a low flow of nitrogen to ensure inert conditions throughout the polymerization. After gelation happened the reaction was allowed to proceed for about 4 more hours, although macroscopic gelation was observed for most of the samples within 10-15 minutes. The prepared gels were cut into smaller pieces and dried in an oven at 85° C. for 48 hours. The dried gel was ground and sieved, with all particles used for subsequent testing collected between a 600 μm and a 300 μm standard sieve.

Specific motivations for the selected comonomers and details of the respective syntheses follow.

AMPS

AMPS is an inexpensive and commercially available hydrophilic, sulfonic acid-based monomer that has a permanent charge at pH values well below physiological pH, providing a high degree of hydrophilicity and anionic character over a wide range of pH.

Hydrogels were prepared using the general conditions described above. As AMPS is a strong acid, the amount of necessary NaOH to achieve 70% total ionization during copolymerization with AA (AMPS+AA, corresponding to all AMPS and a fraction of the residual AA based on the $pK_a$s of the two monomers) was calculated. After completely dissolving the NaOH pellets and acrylic acid in water, AMPS was added to the neutralized mixture. The gelation happened in less than 10 minutes, although the reaction was continued for 4 more hours. All the prepared gels appeared clear and were neither sticky nor excessively brittle. The gels remained clear upon drying, although a slight yellowish color was observed which disappeared upon rehydration of the gels.

HEMA

HEMA is a hydrophilic monomer widely used in commercial applications such as contact lenses. Depending on the physical and chemical structure of the polymer, HEMA hydrogels have been reported to absorb from 10 to 600% water relative to the dry weight without containing a charged residue, making the resulting swelling significantly less sensitive to salt (as desired). 10, 15, 20 mole % of the AA monomers was replaced with HEMA, first using the same conditions as described above. However, no gel formation was observed after 2 hrs even after increasing the amount of crosslinker or initiator by 10%. Substituting potassium persulfate with ammonium persulfate as the initiator resulted in gelation with in 15 minutes. The clear gels were neither excessively sticky nor brittle and they remained clear, albeit with a slight yellow color upon drying.

VSA

Vinyl sulfonic acid is a highly reactive unsaturated sulfonic acid. It is a colorless, water-soluble liquid, although commercial samples can appear yellow or even red. Polyvinyl sulfonic acid (PVSA; as sodium salt) is a blood-compatible polyclectrolyte that has negatively charged sulfonate groups.

Hydrogels were prepared using the general conditions described above. Gelation occurred quickly (within about 15 minutes) to create clear but extremely sticky gels that were difficult to remove from the beaker. During the drying process, the gels remained sticky and turned slightly yellow while remaining clear. Based on their sticky nature, the gels were also difficult to grind.

PEGMMA (Mn=300-500 g/mol)

PEGMMA is a highly hydrophilic uncharged biocompatible monomer with a comb-like structure, with the comb consisting of a hydrophilic side-chain comprised of ethylene oxide (EO) repeat units. The length of the side chain can be tuned by the use of PEGMMA with different numbers of ethylene oxide (EO) groups, with short chains (n=2 repeat units) exhibiting thermoresponsive properties while long chains (n>8) exhibiting highly hydrophilic properties. Poly (ethylene glycol) (PEG) is commonly used in biomaterials as a highly water binding polymer that can repel protein adsorption, with its high water binding (about 3-4 water molecules per ethylene oxide repeat unit) attributed to hydrogen bonding with the ether oxygens in the repeat unit coupled with the steric flexibility of the polymer. When PEG of a sufficient length is incorporated into PEGMMA as a side-chain, these similar water binding properties, which are relatively independent of salt concentration given the absence of charge, are expected to be retained, coupled with the potential to sterically screen charge interactions between adjacent acrylic acid residues.

Hydrogels were prepared using the general conditions described above. However, phase separation was observed as the pre-gel mixture was heated to the 70° C. set point temperature required for persulfate-based initiation. To prevent this phenomenon, the initiator was changed from a thermal to a redox initiator, combining ammonium persulfate (APS) with the redox accelerator N, N, N',N'-tetramethylethylenediamine (TEMED). This system can provide a lower induction period and higher conversion at lower temperature compared with the other redox systems for low-temperature polymerization reactions. By using this initiator, the polymerization of PEGMMA/AA was successfully carried out at both 40° C. and at room temperature without any visible phase separation. The monomer addition strategy was also altered to ensure avoidance of phase separation. The NaOH pellets were first dissolved in water and a dropping funnel was used for dropwise adding of the mixture of AA/PEGMMA monomers to the reaction flask on an ice bath. The reaction mixture was purged with $N_2$ for 5-10 minutes and then APS/TEMED was added to the reaction. Then, the temperature was increased to 40° C. and polymerization was allowed to proceed for 4 hours, with gelation observed within about 10-15 min. Finally, the gels were cut, dried in an oven at 85° C., ground, and sieved as previously described. For some of the gels, a thin opaque layer was formed at the outside of the gel after drying; however, most gels remained clear as previously described for the other comonomer systems. Samples were prepared using different lengths of PEG side chains (n=4, 9) and by substituting different mol % of AA with PEGMMA (10, 15, or 20 mol %)

PEGMA (Mn=360 g/mol)

PEGMA is a highly hydrophilic biocompatible monomer with the same basic properties as PEGMMA but with the side chains terminated with an OH group rather than a methyl group. In this context, PEGMA represents a direct analogue of HEMA in which the hydrophilic —OH group is tethered further from the polymer backbone and a direct analogue of PEGMMA in which the end of the PEG chain can hydrogen bond. Polymerization was conducted using the same method as described above for PEGMMA, resulting in similarly clear but very brittle gels at PEGMA contents ranging from 10-15 mole %. Hydrogels based on different combinations of AA/PEGMMA/PEGMA and PEGMA/VSA were also synthesised to assess the potential of mixing monomers with different properties on swelling properties. In this context, hydrogels were prepared containing 90-75 mole % AA, 7, 10, 12, 15, or 20 mole % PEGMMA, 5, 8, or 10 mole % PEGMA, and 2-S mole % VS to assess relative swelling. Acrylic acid-only control sample were synthesized by each initiation system (i.e. potassium persulfate at 70° C.

and ammonium persulfate/TEMED at 40° C.) to ensure proper interpretation of the effect of comonomer content on swelling responses.

AMPS-PEGMMA Copolymer Hydrogels

To assess the potential of using a mixture of strong acid comonomers and neutral highly water binding comonomers, copolymer hydrogels of AMPS and PEGMMA were prepared using the same APS/TEMED redox initiation protocol used to formulate the AA-PEGMMA hydrogels. PEGMMA contents ranging from 10-15 mol % were used, with AMPS comprising the remainder of the formulation. All other process and chemical variables used were consistent with the general protocol.

Example 5. AUL and CRC Results of Copolymer Compositions

The swelling results, namely absorption under load (AUL) and centrifuge retention capacity (CRC), for copolymer compositions prepared according to Example 4 are presented in Table 1.

AUL was measured according to the procedures of Example 2.

In contrast to AUL testing, in which a dry powder of SAP is hydrated under load, a CRC test measures the capacity of a pre-swollen SAP to retain water under force. To perform the test, about 100 mg ($W_1$) of the dried SAP sample was weighed into a pre-weighed tea bag. The tea bag was immersed in 0.9 saline solution for 1 hour to swell the SAP. Subsequently, the tea bag was placed inside a cylindrical centrifuge tube containing a porous inside to allow for water drainage and centrifuged for 3 minutes at 1600 rpm. As a control, an empty tea bag also was put in saline and centrifuged at the same speed. After centrifugation, the tea bag was weighed again ($W_2$), and the difference between the dried and swollen sample was calculated. The CRC amount was calculated by Equation (2):

$$CRC\left(\frac{g}{g}\right) = \frac{W_2 - W_1}{W_1}. \quad (2)$$

All AUL measurements reported represent averages of 2-3 repeat measurements per batch. In cases where more than one AUL number is reported, the second number represents an independent replicate batch. CRC was measured using 100 g weights.

TABLE 1

AUL and CRC results for copolymer superabsorbent hydrogels prepared with different functional co-monomers.

| Copolymer | AUL (g/g) 0.3 PSI | % Change vs control | CRC (g/g) | % Change vs control |
|---|---|---|---|---|
| AA control | 11.5 | | 45.2 | |
| | 12.0 | | 43.0 | |
| | 12.5 | | 42.0 | |
| AA 90%/VSA 10% | 12.5-10.2 | −5 | 41 | −5 |
| AA 85%/VSA 15% | 11.0-9.0 | −8 | 39.3 | −9 |
| AA 90%/HEMA 10% | 12.5-11.5 | 2 | 33.1 | −23 |
| AA 85%/HEMA 15% | 11.4-11.2 | −2 | 31.5 | −26 |
| AA 90%/PEGMMA (300) 10% | 16.0-17 | 38 | 32 | −25 |
| AA 90%/PEGMMA (500) 10% | 14.4 | 20 | 33 | −23 |
| AA 85%/PEGMMA (500) 10%/AMPS 5% | 13.6 | 13 | 34.2 | −20 |

The swelling results indicate an increase in AUL using most of the synthesized copolymers in comparison to the control hydrogels. This clearly indicates the benefits of copolymerizing monomers that have different mechanisms for water binding (PEGMMA, PEGMA, HEMA) into AA-based SAPs.

Copolymerization appears to reduce the CRC of most hydrogels, with most copolymers resulting in CRC decreases in the order of 5-26%. This opposite trending of CRC and AUL is consistent with conventional observations, although minimizing this CRC reduction is desirable.

Copolymerization of PEGMMA is unique in that the PEGMMA monomer phase separates either directly upon addition to AA or during polymerization. Under such conditions (70° C., KPS initiation), very high increases in AUL, up to double that of the AA control, were observed in some cases. However, some of these formulations phase separated too much prior to gelation and subsequently fail to form a gel at all.

Example 6. PEGMMA-Based Hydrogels Synthesized Using APS/TEMED

The high AUL values and smaller decreases in CRC relative to those achieved by either AMPS or HEMA alone motivated development of reliable copolymerization strategies for PEGMMA-based hydrogels using the APS/TEMED system which can polymerize at 40° C. and avoid the need to heat the monomers above the temperature at which phase separation occurs. AUL and CRC results from such copolymerizations with PEGMMA, both alone with AA as well as with some other comonomers of potential interest (e.g. PEGMA and VSA), are shown in Table 2.

TABLE 1

AUL and CRC results for PEGMMA-based copolymer superabsorbent hydrogels prepared with different functional co-monomers using the redox initiator system (APS/TEMED; temperature: 40° C.).

| Copolymer | AUL (g/g) | % Change vs control | CRC (g/g) | % Change vs control |
|---|---|---|---|---|
| AA control | 12.5 | | 46.5 | |
| (APS/TEMED 40° C.) | 11.8 | | 47.1 | |
| | 12.0 | | 45.0 | |
| AA 90%/PEGMMA 10% | 16.1 | 28 | 34 | −20 |
| AA 85%/PEGMMA 15% | 16.2 | 33 | 32 | −25 |
| AA 85%/PEGMMA 10%/PEGMA 5% | 15.2-14.2 | 17 | 28.4 | −34 |
| AA 85%/PEGMMA 5%/PEGMA 10% | 11.8-12.3 | −1 | 24.0 | −44 |
| AA 80%/PEGMMA 12%/PEGMA 8% | 15.0 | 24 | 27.3 | −36 |
| AA 85%/PEGMMA 8%/PEGMA 7% | 14.8 | 21 | 26.6 | −38 |
| AA 75%/PEGMMA 20%/PEGMA 5% | 13.9 | 14 | 29.2 | −32 |
| AA 88%/PEGMMA 10%/VSA 2% | 13.3 | 9 | 38.4 | −12 |
| AA 85%/PEGMMA 10%/VSA 5% | 11.6 | −5 | 34.3 | −20 |
| AA 90%/PEGMMA 10%/100% AA neutralization | 12.8 | −4 | 45 | +6 |

Using the APS/TEMED method, reproducible and more visually homogeneous hydrogels can be achieved that maintain high increases in AUL about 9-33% relative to the AA-only control. The change in the initiator system from KPS 70° C. to APS/TEMED 40° C. did not change the AUL or CRC measured for the control AA-only gel (e.g. compare row 1 of Table 1 with row 1 of Table 2). Therefore, the new initiation system does not impact the gel properties aside from changing the degree of phase separation observed with the PEGMMA system.

Mixing PEGMMA (methyl terminated side-chain) and PEGMA (OH-terminated side chain) had minimal benefit in terms of increasing AUL relative to the use of PEGMMA alone, although gels prepared with PEGMA alone showed only smaller increases in AUL and much larger decreases in CRC relative to PEGMMA-only or PEGMA-co-PEGMMA copolymers.

Incorporating a small amount of VSA into the PEGMMA copolymer formulations significantly reduced the AUL but substantially increased the CRC relative to the PEGMMA-only formulations. However, these hydrogels remained somewhat sticky.

Substituting more than 15% of the acrylic acid with PEGMMA or any PEG derivative reduced the AUL benefits associated with the copolymer while (particularly at 25% total monomer substitution) dramatically reducing the CRC in all cases; a similar trend was observed in Table 1 in several recipes tested that used 80% or lower AA mole percentages.

Example 7

The substantial decreases in CRC observed with the AA copolymer recipes that provided the best AUL results motivated the investigation of the potential of using the strong acid AMPS as the primary charged monomer coupled with PEGMMA as the neutral water binding monomer.

TABLE 3

AUL and CRC results for AMPS-PEGMMA superabsorbent hydrogels prepared with the redox initiator system (APS/TEMED; temperature: 40° C.).

| Copolymer | Crosslinker | pH | AUL (g/g) 0.3 PSI | CRC (g/g) |
|---|---|---|---|---|
| AA control | MBAA | 4.5 | 12.5 | 43 |
| AMPS 90%/PEGMMA (300) 10% | MBAA | 5.7 | 17.0 | 28 |
| AMPS 88%/PEGMMA (300)12% | MBAA | 7.5 | 18.5 | 26 |
| AMPS 80%/PEGMMA (300) 20% | MBAA | 7.3 | 18.0 | 25 |
| AMPS 90%/PEGMMA (500) 10% | MBAA | 4.48 | 16.3 | 26 |
| AMPS 80%/PEGMMA (500) 20% | PEGDA | 7.0 | 14.3 | 24 |

The polymerization and gelation in poly (AMPS-co-PEGMMA) happens very rapidly even at room temperature. All the samples exhibited easy gelation starting at between about 27° C. and 40° C. The samples looked completely clear and white with good AUL (15-20% higher) but very low CRCs (35-45%). In part, this result may be attributable to the challenges inherent in estimating an appropriate degree of neutralization for a strong acid such as AMPS. Gelation does not occur unless the equivalent of at least 70% neutralization of NaOH is added, and the addition of the same molar concentration of NaCl salt instead of NaOH also does not facilitate gelation. Thus, NaOH is a critical factor in the success of this reaction and thus the performance of the resulting SAPs.

Example 8

FIG. 1 shows the appearance of AMPS-co-PEGMMA samples after swelling compared to a commercial (surface-crosslinked) sample and a control (AA only, no surface crosslinking) sample.

Figure 2:
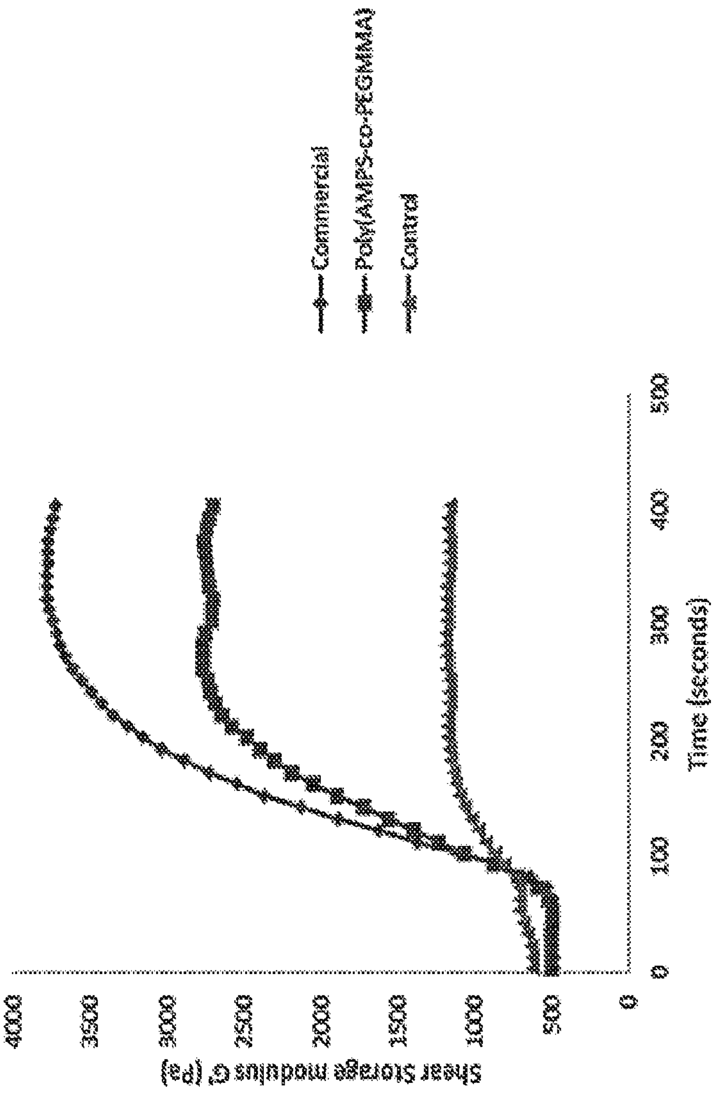
FIG. 2 is an exemplary embodiment depicting the shear storage modulus as a function of time during swelling for a commercial (surface-crosslinked) sample (left), a AMPS-co-PEGMMA sample (middle) in accordance with the present disclosure, and a control (AA only, no surface crosslinking) sample (right).

The swelling dynamics of AMPS-PEGMMA samples were measured using an ElastoSens Bio, which non-destructively measures viscoelastic (complex Young modulus) properties of soft biomaterials. A pre-weighed amount of SAP was loaded into a detachable sample-holder, after which saline was added and the measurement was started to continuously observe long-term changes in hydrogel modulus (and thus water binding) during the swelling process. FIG. 2 shows the shear storage modulus of each hydrogel as a function of time during the swelling process as measured with the ElastoSens Bio.

Based on the physical appearance of the samples, the AMPS-PEGMMA samples showed better performance relative to the AA-only control in terms of the capacity for water penetration and gel strength after swelling, even in the absence of any surface crosslinking. These results present a potential advantage in the practical use of the copolymer hydrogels as SAPs.

The quantitative measurements of swelling indicate a similar effect, with the AMPS-PEGMMA sample swelling significantly faster and increasing in modulus more similar to the commercial SAP that is surface crosslinked. These results suggest that the modified formulations may be engineered to have similar properties to existing commercial samples while avoiding the additional cost and leaching issues inherent with surface crosslinking.

Example 9

AA-PEGMMA hydrogels were prepared using PEG di(meth)acrylate crosslinkers with different numbers of ethylene oxide groups (EGDMA—1 PEG unit; PEGDA—5 PEG units; PEGDMA—7 PEG units) to explore the effect of the hydrophilicity and flexibility of the crosslinker on swelling. Table 4 shows the resulting AUL and CRC values for this test.

TABLE 4

AUL and CRC results are shown for Poly (AA-co-PEGMMA) hydrogels superabsorbent hydrogels synthesized with PEG di(meth)acrylate crosslinkers containing different numbers of PEG groups prepared with the redox initiator system (APS/TEMED; temperature: 40° C.).

| Copolymer | Crosslinker | pH | AUL (g/g) 0.3 PSI | CRC (g/g) |
|---|---|---|---|---|
| AA control | PEGDMA | 4.5 | N/A (very sticky; could not grind) | |
| AA 90%/PEGMMA 10% | PEGDMA | 4.94 | N/A (very sticky; could not grind) | |
| AA 90%/PEGMMA 10% | MBAA | 4.9 | 16.5 | 34 |
| AA 90%/PEGMMA 10% | PEGDA | 4.9 | 15 | 30 |
| AA 90%/PEGMMA 10% | EGDMA | 4.79 | 14.5 | 40 |

Hydrogels with similar swelling properties to the MBAA controls can be made with the n=1 EGDMA crosslinker and the n=5 PEGDA crosslinker, although the AUL achieved with the PEGDA crosslinker is substantially higher than the EGDMA crosslinker. However, the longer chain n=7 PEGDMA crosslinker, while successful in producing hydrogels, results in very sticky hydrogels that cannot be ground into a powder. This result is attributed to the increased steric flexibility of the longer PEG chain within the crosslinker.

Example 10

AA-PEGMMA hydrogels were prepared using different molecular weights of PEGMMA (Mn=188—2 PEG units;

Mn=300—4-5 PEG units; Mn=500—7-8 PEG units) to assess the effect of PEG side chain length and hydrophilicity on the resulting swelling responses. Table 5 shows the resulting AUL and CRC values.

TABLE 5

AUL and CRC results for AA-co-PEGMMA superabsorbent hydrogels synthesized with PEGMMA monomers containing different lengths of PEG side-chains prepared with the redox initiator system (APS/TEMED; temperature: 40° C.).

| Copolymer | Crosslinker | pH | AUL (g/g) 0.3 PSI | CRC (g/g) |
|---|---|---|---|---|
| AA control | MBAA | 4.3 | 12.5 | 44 |
| AA 90%/PEGMMA (300) 10% | MBAA | 4.6 | 17 | 35 |
| AA 90%/PEGMMA (500) 10% | MBAA | 4.5 | 11 | 37 |

While each of the PEGMMA chain lengths tested give similar CRC values (about 25% lower than the AA control), only the PEGMMA 300 comonomer provides substantially higher AUL values relative to the AA-only control. The longer PEGMMA 500 monomer results in a hydrogel with long side chains that may adopt a more brush-like structure; in addition, the enhanced steric inhibition associated with copolymerizing the longer side chain comonomer may result in lower crosslinker densities and thus lower AUL values. The shorter PEGMMA 188 monomer, when homopolymerized, creates a polymer with a lower critical solution temperature around room temperature; thus, the lower AUL may be attributable to the introduction of some hydrophobicity into the hydrogel network offsetting the entropy contributions to swelling associated with adding more chain ends within the hydrogel volume. For PEGMMA 188 and some of PEGMMA 300, the resulted dried hydrogels look white and sometimes opaque, indicating phase separation even at the lower 40° C. reaction temperature.

Example 11. Effect of Crosslinker Length

In order to evaluate the effect of the length of the crosslinker on SAP performance, the performance of hydrogels prepared with PEG diacrylate-based crosslinkers with various PEG chain lengths was analyzed for AA-co-AMPS copolymers. AA-only controls were also prepared using the same crosslinker types/amounts to enable direct comparisons of the observed swelling responses.

Hydrogels were prepared using the same protocols typically used for each comonomer mixture but substituting the MBAA content with the same molar ratio of PEGDA, EGDMA, or PEGDMA. Gelation occurred in a few minutes to create clear gels, although hydrogels crosslinked by EGDMA and PEGDMA were somewhat stickier than the controls.

It was determined that higher AUL values can be achieved by using higher crosslink densities. However, consistently high AULs are observed at degrees of neutralization of 70%, 75%, or 80%. This relative independence of the degree of neutralization is a process-related benefit to using the AMPS copolymerization approach for formulating SAPs, as AA-only hydrogels are more sensitive to the degree of neutralization of the reaction mixture.

Example 12. Comparison Between PEGMMA- and PEGMA-Based PAMs

Table 6 compares AUL and CRC data for a number of AA, AA/PEGMMA (with terminal hydroxyl group capped by methyl group) and AA/PEGMA (with terminal hydroxyl group) PAMs. The only difference between PEGMMA and PEGMA is that the terminal hydroxyl group of PEGMMA is capped by a methyl group and PEGMA has a terminal hydroxyl group. Both average molecular weights are 300 g/mol. All the SAM particles have the same molar crosslinker density of 0.2% and neutralization level of 70% for AA monomeric units. The polymerization conditions and particles were prepared by using the same procedures under identical conditions. AUL and CRC measurements are obtained under identical conditions.

Due to the stickiness of pure PEGMMA and PEGMA hydrogels, no pure PEGMMA and PEGMA SAM particles were obtained. AA/PEGMMA SAM particles with higher than 15% of PEGMMA were available due to lack of compatibility of PEGMMA in high concentration of PEGMMA.

The data in Table 6 demonstrate that incorporation of a minor portion of methyl-capped neutral PEGMMA increases AUL significantly vs PAA without PEGMMA. A small amount of PEGMA into PAA has no significantly impact on AUL. However, too much of PEGMA has a significantly negative impact on AUL.

TABLE 6

AUL results for AA-co-PEGMMA and AA-co-PEGMA superabsorbent hydrogels.

| Composition | AUL (1 hour) |
|---|---|
| AA 100% | 12.5 |
| AA 95%/PEGMMA 5% | 13.6 |
| AA 90%/PEGMMA 10% | 16.5 |
| AA 85%/PEGMMA 15% | 16.8 |
| AA 90%/PEGMA 10% | 12.2 |
| AA 85%/PEGMA 15% | 11.1 |
| AA 80%/PEGMA 20% | 10.1 |
| AA 70%/PEGMA 30% | 7.5 |

Table 7 compares the absorbency performance of AMPS, AMPS/MEA and AMPS/HEMA based SAM particles. All the SAMs have the same molar crosslinker density of 0.24% MBAA and have the same neutralization during polymerization. Incorporation of a minor portion of MEA into AMPS-based SAM increases AUL while incorporation of HEA into AMPS-based SAM decreases AUL. Methylation of the hydroxyl group in HEA converts HEA into MEA. Thus, the methyl group capping of the hydroxyl group in HEA improves absorbency performance. Hydrogels of pure HEA and MEA were too sticky to process into SAM particles. The AUL data was collected at 1 hour and 24 hours under 0.3 PSI in 0.9% saline.

TABLE 7

AUL results for AA-co-MEA and AA-co-HEA superabsorbent hydrogels.

| SAM composition | 1 hr AUL | 24 hrs AUL |
|---|---|---|
| AMPS | 5.9 | 18.1 |
| AMPS 80%/MEA 20% | 7.7 | 23.3 |
| AMPS 70%/MEA 30% | 7.1 | 22.0 |
| AMPS 60%/MEA 40% | 6.1 | 19.6 |
| AMPS 80%/HEA 20% | 4.9 | 16.2 |
| AMPS 70%/MEA 30% | 4.7 | 15.1 |

The results herein demonstrate that copolymerization of monomers with different mechanisms to bind water significantly change the absorbency of AA-based hydrogels. AA- PEGMMA and AMPS-PEGMMA copolymer hydrogels show particularly good AUL responses.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "Including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A superabsorbent polymer comprising
a copolymer comprising
a major portion of charged monomers;
a minor portion of alkyl or aryl end-capped neutral and hydrophilic monomers; and
optionally a crosslinker;
wherein the alkyl or aryl end-capped neutral and hydrophilic monomers lack free hydroxyl groups and have a water solubility of at least 200 mg/mL;
wherein the major portion is present in an amount greater than about 50 mol % of the copolymer and the minor portion is present in an amount more than about 5 mol % and less than about 50 mol % of the copolymer;
wherein the minor portion comprises an alkyl or aryl end-capped neutral and hydrophilic monomer having a molecular weight less than 1000 g/mol;
wherein the copolymer lacks structured ordering of the charged monomers and the alkyl or aryl end-capped neutral and hydrophilic monomers;
wherein the charged monomers are selected from the group consisting of salts of acrylic acids, vinyl sulfonic acids, vinyl phosphoric acids, partially hydrolyzed maleic anhydrides; and
wherein the alkyl or aryl end-capped neutral and hydrophilic monomers are selected from the group consisting of polyethylene glycol monomethylether monomethacrylate, methoxy ethyl acrylate, compounds according to Formula I:

(Formula I)

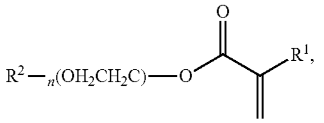

wherein n is a number in the range of 1-50 and $R^1$ and $R^2$ are each independently selected from the group consisting of hydrogen, linear or branched $C_1$-$C_6$ alkyl groups, and combinations thereof.

2. The superabsorbent polymer of claim 1, wherein the major portion is present in an amount greater than about 65 mol % of the copolymer and the minor portion is present in an amount less than about 35 mol % of the copolymer.

3. The superabsorbent polymer of claim 1, wherein the superabsorbent polymer is in a form selected from the group consisting of a particle, a gel, a fiber, a bead, a liquid, a solid, a paste, and combinations thereof.

4. The superabsorbent polymer of claim 1, wherein the superabsorbent polymer is in the form of a particle with a diameter in the range of about 100 μm to about 1000 μm.

5. The superabsorbent polymer of claim 1, wherein the superabsorbent polymer is surface-crosslinked.

6. The superabsorbent polymer of claim 1, wherein the crosslinker density is in the range of about 0.05 wt % to about 1 wt %.

7. The superabsorbent polymer of claim 1, wherein the minor portion of alkyl or aryl end-capped neutral and hydrophilic monomers comprises an alkyl or aryl end-capped neutral and hydrophilic monomer having a water solubility in the range of about 200 mg/mL to about 500 mg/mL.

8. A method of making a superabsorbent polymer comprising
a copolymer comprising
a major portion of charged monomers;
a minor portion of alkyl or aryl end-capped neutral and hydrophilic monomers; and
optionally a crosslinker;
wherein the alkyl or aryl end-capped neutral and hydrophilic monomers lack free hydroxyl groups and have a water solubility of at least 200 mg/mL, wherein the major portion is present in an amount greater than about 50 mol % of the copolymer and the minor portion is present in an amount more than 5 mol % and less than about 50 mol % of the copolymer, wherein the minor portion comprises an alkyl or aryl end-capped neutral and hydrophilic monomer having a molecular weight less than 1000 g/mol; wherein the copolymer lacks structured ordering of the charged monomers and the alkyl or aryl end-capped neutral and hydrophilic monomers, wherein the charged monomers are selected from the group consisting of salts of acrylic acids, vinyl sulfonic acids, vinyl phosphoric acids, and partially hydrolyzed maleic anhydrides; and wherein the alkyl or aryl end-capped neutral and hydrophilic monomers are selected from the group consisting of polyethylene glycol, monomethylether monomethacrylate, methoxy ethyl acrylate, compounds according to Formula I:

(Formula I)

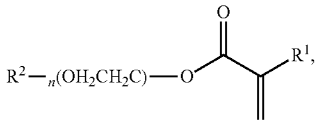

wherein n is a number in the range of 1-50 and $R^1$ and $R^2$ are each independently selected from the group consisting of hydrogen, linear or branched $C_1$-$C_6$ alkyl groups, and combinations thereof, the method comprising forming a mixture comprising
- a solvent
- a charged monomer;
- an alkyl or aryl end-capped neutral and hydrophilic monomer; and
- optionally a crosslinker initiating a reaction; and reacting the mixture.

9. The method of claim 8, wherein the method step of initiating a reaction comprises adding to the mixture an initiator, an accelerator, or a combination thereof.

10. The method of claim 8, wherein the method step of reacting the mixture comprises reacting the mixture in an inert atmosphere.

11. The method of claim 8, wherein the method step of reacting the mixture comprises heating the mixture.

12. The method of claim 8, wherein the method further comprises drying the produced superabsorbent polymer.

13. The method of claim 8, wherein the method further comprises grinding the produced superabsorbent polymer.

14. A method of using a superabsorbent polymer comprising a copolymer comprising
- a major portion of charged monomers;
- a minor portion of alkyl or aryl end-capped neutral and hydrophilic monomers; and optionally a crosslinker;

wherein the alkyl or aryl end-capped neutral and hydrophilic monomers lack free hydroxyl groups and have a water solubility of at least 200 mg/mL, wherein the major portion is present in an amount greater than about 50 mol % of the copolymer and the minor portion is present in an amount more than about 5 mol % and less than about 50 mol % of the copolymer, wherein the minor portion comprises an alkyl or aryl end-capped neutral and hydrophilic monomer having a molecular weight less than 1000 g/mol, wherein the copolymer lacks structured ordering of the charged monomers and the alkyl or aryl end-capped neutral and hydrophilic monomers, wherein the charged monomers are selected from the group consisting of salts of acrylic acids, vinyl sulfonic acids, vinyl phosphoric acids, partially hydrolyzed maleic anhydrides, wherein the alkyl or aryl end-capped neutral and hydrophilic monomers are selected from the group consisting of polyethylene glycol, monomethylether monomethacrylate, methoxy ethyl acrylate, compounds according to Formula I:

(Formula I)

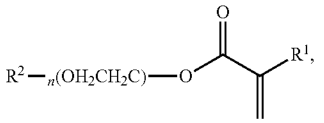

wherein n is a number in the range of 1-50 and $R^1$ and $R^2$ are each independently selected from the group consisting of hydrogen, linear or branched $C_1$-$C_6$ alkyl groups, and combinations thereof, the method comprising using the superabsorbent polymer in a consumer product.

15. The method of claim 14, wherein the superabsorbent polymer is in the form of a particle with a diameter in the range of about 100 μm to about 1000 μm.

16. The method of claim 14, wherein the consumer product is selected from the group consisting of cloth products, diapers, feminine napkins, and disposable bed liners.

* * * * *